(12) United States Patent
Kalkanoglu et al.

(10) Patent No.: US 9,540,820 B2
(45) Date of Patent: Jan. 10, 2017

(54) MULTILAYER ROOFING SHEET WITH MECHANICAL INTERLOCK LAMINATE STRUCTURE

(75) Inventors: Husnu M. Kalkanoglu, Swarthmore, PA (US); Gregory F. Jacobs, Oreland, PA (US)

(73) Assignee: CertainTeed Corporation, Malvern, PA (US)

( * ) Notice: Subject to any disclaimer, the term of this patent is extended or adjusted under 35 U.S.C. 154(b) by 880 days.

(21) Appl. No.: 12/057,906

(22) Filed: Mar. 28, 2008

(65) Prior Publication Data

US 2008/0248241 A1    Oct. 9, 2008

Related U.S. Application Data

(60) Provisional application No. 60/910,042, filed on Apr. 4, 2007.

(51) Int. Cl.
| | |
|---|---|
| *E04D 5/10* | (2006.01) |
| *D06N 5/00* | (2006.01) |
| *B32B 27/12* | (2006.01) |
| *B32B 11/10* | (2006.01) |
| *B32B 38/06* | (2006.01) |
| *B32B 5/02* | (2006.01) |
| *B32B 37/20* | (2006.01) |
| *B32B 37/24* | (2006.01) |

(52) U.S. Cl.
CPC ............... *E04D 5/10* (2013.01); *B32B 5/028* (2013.01); *B32B 11/10* (2013.01); *B32B 27/12* (2013.01); *D06N 5/00* (2013.01); *B32B 37/203* (2013.01); *B32B 38/06* (2013.01); *B32B 2037/243* (2013.01); *B32B 2307/724* (2013.01); *B32B 2307/7265* (2013.01); *B32B 2419/06* (2013.01); *Y10T 156/10* (2015.01); *Y10T 428/24355* (2015.01)

(58) Field of Classification Search
CPC ........ B32B 27/12; B32B 11/10; B32B 37/203; B32B 38/06; B32B 2307/724; B32B 2307/7265; B32B 2419/06; B32B 2037/243; E04D 5/10; Y10T 428/24355; Y10T 156/10; Y10T 442/143; Y10T 442/145; Y10T 442/148; Y10T 442/153; Y10T 442/159–442/169; Y10T 442/176; Y10T 442/181; Y10T 442/184; Y10T 442/191; Y10T 442/193; Y10T 442/30; Y10T 442/3854–442/3919; Y10T 442/674–442/679
USPC ............ 442/59, 1, 2, 20, 26, 35, 37, 38, 43, 50,442/58, 85, 164, 172, 173; 428/141
See application file for complete search history.

(56) References Cited

U.S. PATENT DOCUMENTS

| | | | | |
|---|---|---|---|---|
| 4,301,204 | A | * | 11/1981 | McCusker et al. ............ 428/110 |
| 4,539,254 | A | * | 9/1985 | O'Connor et al. ............. 442/32 |
| 4,599,258 | A | * | 7/1986 | Hageman ...................... 428/140 |
| 5,108,831 | A | * | 4/1992 | Green ............................ 442/24 |
| 5,456,785 | A | | 10/1995 | Venable |
| 5,620,554 | A | | 4/1997 | Venable |
| 5,632,946 | A | * | 5/1997 | Bacon et al. ................. 264/212 |

(Continued)

FOREIGN PATENT DOCUMENTS

EP          1 985 775          10/2008

*Primary Examiner* — Jennifer A Steele
(74) *Attorney, Agent, or Firm* — Paul & Paul

(57) ABSTRACT

A multilayer roofing sheet includes a laminate formed from an upper sheet having a textured lower surface and a lower sheet having a fusible upper surface mechanically interlocked together.

18 Claims, 2 Drawing Sheets

(56) References Cited

U.S. PATENT DOCUMENTS

| | | | |
|---|---|---|---|
| 5,643,399 | A | 7/1997 | Venable |
| 6,245,850 | B1 | 6/2001 | Fields |
| 6,296,912 | B1 | 10/2001 | Zickell |
| 6,502,360 | B2 | 1/2003 | Carr, III et al. |
| 6,679,018 | B2 | 1/2004 | Georgeau et al. |
| 6,861,135 | B2 | 3/2005 | Zhou |
| 2002/0127933 | A1* | 9/2002 | Baccus et al. ............ 442/86 |
| 2002/0160151 | A1 | 10/2002 | Pinault et al. |
| 2003/0068469 | A1 | 4/2003 | Aschenbeck et al. |
| 2004/0009319 | A1 | 1/2004 | Zanchetta et al. |
| 2004/0013854 | A1 | 1/2004 | Zanchetta et al. |
| 2006/0201610 | A1 | 9/2006 | Bartek |
| 2006/0292945 | A1* | 12/2006 | Kuhn et al. ............ 442/38 |
| 2007/0178784 | A1* | 8/2007 | Jones et al. ............ 442/41 |

\* cited by examiner

MULTILAYER ROOFING SHEET WITH MECHANICAL INTERLOCK LAMINATE STRUCTURE

CROSS-REFERENCE TO RELATED APPLICATIONS

This application claims the priority of U.S. Provisional Application No. 60/910,042 filed Apr. 4, 2007.

BACKGROUND OF THE INVENTION

1. Field of the Invention

The present invention relates to bituminous roofing products such as asphalt-based roofing membranes and processes for making such roofing products.

2. Brief Description of the Prior Art

Asphalt-based roofing membranes are excellent waterproofing materials that have been extensively used in low-slope roofing systems to provide long-lasting and satisfactory roof coverings. Low-slope roofing systems are extensively used for commercial and industrial buildings. Examples of low-slope roofing systems are built-up roofs (BUR), modified bitumen roofs, and single-ply or membrane roofing systems. Asphalt-based roofing membranes are frequently used as waterproofing underlayment in low-rise roofing systems, as well as the uppermost or finish layer in built-up-roofs. Built-up roofs are sometimes covered with a layer of gravel or granular mineral material to protect the roofing membrane against mechanical damage.

Mineral-surfaced asphalt shingles, such as those described in ASTM D225 or D3462, are generally used for steep-sloped roofs to provide water-shedding function while adding aesthetically pleasing appearance to the roofs. Conversely, roll goods such as asphalt-based roofing membranes are generally used for low-slope roofs. Pigment-coated mineral particles are commonly used as color granules in roofing applications to provide aesthetic as well as protective functions. Roofing granules are generally used in asphalt shingles or in roofing membranes to protect asphalt from harmful ultraviolet radiation.

Roofing products such as asphalt shingles and roll stock are typically composite articles including a non-woven glass fiber or felt web covered with a coating of water repellent bituminous material, and optionally surfaced with protective mineral-based roofing granules. The bituminous material is characteristically black in color, and is strongly absorptive of incident solar radiation. Thus, asphalt-based roofing membranes can absorb significant amounts of solar radiation, which can result in elevated roof temperatures. This can contribute to the increase of energy usage for indoor air-conditioning, especially in a hot climate.

Asphalt shingles are generally constructed from asphalt-saturated roofing felts and surfaced by pigmented color granules. Asphalt-based roofing membranes are similarly constructed; except that roofing granules are not frequently employed. However, both asphalt shingles and asphalt-based roofing membranes are known to have low solar reflectivity and hence will absorb solar heat especially through the near-infrared range of the solar spectrum.

This phenomenon typically increases as the surface becomes dark in color. For example, white-colored asphalt shingles with CIE L* greater than 60 can have solar reflectance greater than 25% (ASTM E1918 method), whereas non-white asphalt shingles with L* less than 60 typically have solar reflectance in the range of only 5-20%. As a result, it is common to measure temperatures as high as 71-77 degrees C. (160-170 degrees F.) on the surface of dark roofing shingles on a sunny day with 27 degree C. (80 degrees F.) ambient temperature.

Reduced energy consumption is an important national goal. For example, the State of California has a code requirement that all commercial roofing materials in low-slope applications need to exceed a minimum of 70% solar reflectance in order to meet California's energy budget code. Also, in order to qualify as Energy Star® roofing material, a roofing membrane needs to exceed 65% solar reflectance.

Typically, even a white mineral-surfaced, asphalt-based roofing membrane has only 30-35% solar reflectance.

In order to address this problem, externally applied coatings have sometimes been applied directly onto the shingle or membrane surface on the roof. White pigment-containing latex coatings have been proposed. Similarly, aluminum-coated asphalt roofing membranes have been employed to achieve solar heat reflectivity. U.S. Pat. No. 6,245,850 discloses a reflective asphalt emulsion for producing a reflective asphalt roofing membrane.

The use of exterior-grade coatings colored by infrared-reflective pigments has also been proposed for spraying onto the roof in the field. U.S. Patent Application Publication No. 2003/0068469A1 discloses an asphalt-based roofing material comprising a mat saturated with asphalt coating and a top coating having a top surface layer that has a solar reflectance of at least 70%.

U.S. Patent Application Publication No. 2002/0160151A1 discloses an integrated granule product comprising a film having a plurality of ceramic-coated granules bonded to the film by a cured adhesive and the cured adhesive or the film can have pigments. Such integrated granule product can be directly bonded to an asphalt-based substrate as roofing products.

In order to increase solar reflectance of built-up roofs, reflective coatings have been applied directly onto the surface of the roofing membrane. For example, white pigment containing latex coatings have been proposed and evaluated by various manufacturers. In addition, white single-ply roofing membranes formed from thermoplastic elastomers, PVC, or EPDM, etc., have been developed to achieve the required solar reflectance. Performance Roof Systems (Kansas City, Mo.) has also developed an asphalt-based roofing membrane having a white acrylic pre-impregnated mat on the top surface.

Laminated single-ply roofing membranes are known, such as those disclosed in U.S. Pat. Nos. 6,502,360; 5,456,785; 5,620,554; and 5,643,399. U.S. Pat. No. 6,296,912 discloses a roofing membrane having a fibrous layer on top for providing a secure surface for roof installation personnel.

Multilayer roofing membranes reinforced with polymeric materials are known. Such membranes are available, for example, faced with polyethylene film, or with mineral particles bonded to an underlying polyethylene film.

There is a continuing need for roofing materials that have improved resistance to thermal stresses while providing an attractive appearance. Further, there is a continuing need to develop multilayer asphalt-based roofing membranes with good mechanical strength and strong adhesion between layers.

SUMMARY OF THE INVENTION

The present invention provides an improved multilayer roofing sheet for use in roll roofing for commercial and institutional structures, waterproofing, and the like. In one aspect, the improved multilayer roofing sheet of the present invention comprises a laminate formed from an upper sheet having a textured lower surface; and a lower sheet having a fusible upper surface. Preferably, the upper sheet comprises an upper layer and a lower layer. Preferably, the upper layer comprises at least one polymer film formed from a polymer composition. Preferably, the polymer film is selected from the group consisting of polyvinyl chloride, polyethylene, polypropylene, acid-containing olefin polymers, fluoropolymers, thermoplastic olefin, thermoset polymers, acrylics, acrylonitrile-styrene-acrylate terpolymer, and acrylonitrile-ethylene-styrene terpolymer. Further, the polymer composition preferably comprises a colorant system, which preferably includes titanium dioxide. Preferably, the lower layer of upper sheet is selected from the group consisting of fabrics, scrims, non-woven webs, microporous films, and sheets having microstructured surfaces. Preferably, the lower layer comprises fibers formed of a material selected from the group consisting of polyolefins, polyesters, glasses, inorganic polymers, and nylons. In one embodiment of the present invention, the texture of the lower surface of the upper sheet is provided by a plurality of pores. In another embodiment of the present invention the texture of the lower surface of the upper sheet is provided by a process selected from the group consisting of embossing, molding, and microreplication. In another aspect of the present invention, the lower layer of the upper sheet comprises a textured lower surface. In this case, the textured lower surface of the lower layer of the upper sheet is preferably provided by a process selected from the group consisting of embossing, molding, and microreplication.

In another aspect, the present invention provides a process for forming a multilayer roofing sheet. This process includes the steps of providing an upper sheet having a textured lower surface, providing a lower sheet having a fusible upper layer; and applying the upper sheet to the lower sheet such that the textured lower surface contacts the fusible upper layer to bond the upper sheet to the lower sheet. Preferably, the process further comprises heating the fusible upper layer of the lower sheet to fuse the upper layer. In this process the upper sheet preferably comprises an upper layer and a lower layer. Preferably, the upper layer comprises at least one polymer film formed from a polymer composition. Preferably, the polymer film is selected from the group consisting of polyvinyl chloride, polyethylene, polypropylene, acid-containing olefin polymers, fluoropolymers, thermoplastic olefin, thermoset polymers, acrylics, acrylonitrile-styrene-acrylate terpolymer, and acrylonitrile-ethylene-styrene terpolymer. Preferably, the polymer composition further comprises a colorant system, preferably including titanium dioxide. Preferably, the lower layer of upper sheet is selected from the group consisting of fabrics, scrims, non-woven webs, microporous films, and sheets having microstructured surfaces. Preferably, the lower layer comprises fibers formed from materials from the group consisting of polyolefins, polyesters, glasses, inorganic polymers, and nylons. In one embodiment of the present process, the texture of the lower surface of the upper sheet is preferably provided by a plurality of pores. In another embodiment of the present process, the texture of the lower surface of the upper sheet is provided by a process selected from the group consisting of embossing, molding, and microreplication. In another aspect of the process of the present invention, the lower layer of the upper sheet comprises a textured lower surface. Preferably, in one embodiment of this aspect the texture of the lower surface of the lower layer of the upper sheet is provided by a process selected from the group consisting of embossing, molding, and microreplication.

In another embodiment of this aspect, the lower surface of the upper sheet comprises a fibrous material. In this embodiment of the present process, the process preferably further comprises a process in which the lower surface of the upper sheet is prepared for attachment of fibers to generate said textured lower surface. In this embodiment, the process also preferably further comprises adhering a plurality of fibers to the lower surface of the upper sheet by a process selected from the group consisting of melt-blowing, dropping, sprinkling, and laminating. Preferably, the fibers are partially embedded in the lower surface of the upper sheet. Preferably, the fibers partially protrude from the lower surface of the upper sheet. Preferably, the partially protruding fibers of the lower surface of the upper sheet contact the fusible upper surface of the lower sheet when the upper sheet is applied to the lower sheet.

In another aspect, the process further comprises forming pores in the lower surface of the upper sheet by a process selected from the group consisting of needle punching and perforating to form the textured lower surface. In yet another aspect, the process further comprises generating an open cell foam structure in the lower surface of the upper sheet to provide the textured lower surface. In another aspect, the process further comprises employing a microporous polymer film to form the textured lower surface of the upper sheet.

It is preferred in the process of the present invention that wherein the fusible upper layer flows into the textured lower surface. Further, in the present process it is preferred that wherein the textured surface penetrates into and is at least partially embedded in the fusible upper layer. Preferably, in the process of the present invention, the upper sheet is formed by coating at least one composition comprising a polymer onto a web. Preferably, the web is selected from the group consisting of fabrics, scrims, non-woven webs, microporous films, and sheets having microstructured surfaces.

DETAILED DESCRIPTION

Figure 1:
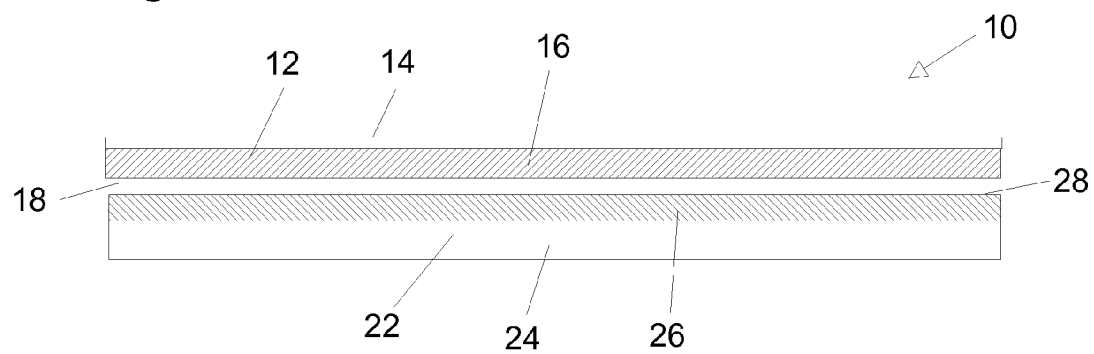
FIG. 1 is a schematic sectional elevation view of a multilayer roofing sheet according to a first embodiment of the present invention prior to final assembly.
Figure 2:
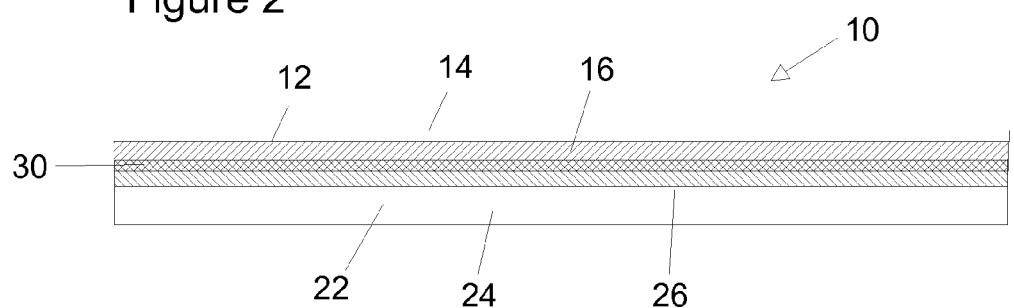
FIG. 2 is a schematic sectional elevation view of the multilayer roofing sheet of FIG. 1 after assembly.

The present invention provides a solution to the problem of enhancing the adhesion between layers in a multilayer roofing sheet. The present invention provides a multilayer roofing sheet having a mechanical interlock between the upper layer or layers and the lower layer of a roofing product. A structured surface is provided on the lower major surface of a first or upper layer of a multilayer roofing sheet. The structured surface is contacted with material which is to become the adjacent second or lower layer underlying the upper layer and the second layer is brought to a state of fluidity such that it can flow and penetrate into the structure of the structured surface on the lower major surface of the upper layer.

As used throughout this specification and claims, "fusible" means capable of being rendered flowable or of being melted, as by the application of heat.

In one aspect of the present invention, the mechanical interlock is achieved by means of providing a "fuzzy" or rough surface on one of the layers of the roofing product to be assembled whereby the surface irregularities are allowed to penetrate into the surface of a second layer of the construction thereby imparting mechanically enhanced adhesion between the two layers. In a second aspect, a degree of porosity can be provided in one of the layers such that contact with a second layer while the second layer is in a substantially fluid state allows penetration of the second layer into the pores of the first layer, thereby imparting mechanically enhanced adhesion between the two layers.

The surface roughness of the "fuzzy," rough, porous, or structured surfaces of the components of the multilayer roofing products of the present invention can be measured by conventional methods. For example, the surface roughness of nonwoven surfaces can be measured by optical techniques, such as by employing an optical, non-contact profilometer and applying Fourier analysis of surface images obtained. The thickness of the structured surface layer depends on a variety of factors, such as the composition of the material comprising the structured surface layer, the geometry of the structure, and the like. However, the structured surface layer should be sufficiently thick so as to provide a good mechanical bond when the multilayer roofing sheet is assembled.

Preferably, the top or outside surface of the multilayer roofing sheet provides special functionality to the roofing sheet, such as weatherability, solar reflectivity, color, aesthetics, mechanical performance features such as wear resistance, skid resistance, and the like. Solar reflectivity is particularly preferred.

In one presently preferred embodiment, the present invention provides a multilayer roofing sheet comprising a white-pigmented polymer film for solar reflectivity, a nonwoven web, and an asphalt roofing membrane precursor. The asphalt roofing membrane precursor is a process intermediate used in the production of a granule or sand coated roofing sheet except that the granules or sand have not yet been applied to the top surface of the asphalt roofing membrane precursor. In this embodiment, the nonwoven web is fused to a lower surface of the polymer film to form an intermediate laminate. The intermediate laminate formed by the polymer film with the nonwoven web on the lower surface is brought into contact with the top surface of the asphalt roofing membrane precursor such that the asphalt on the top surface penetrates into the nonwoven web, thus adhering the membrane precursor to the polymer film.

In another presently preferred embodiment, the present invention provides a multilayer roofing sheet comprising a white pigmented polymer film, a nonwoven web, and a "built up roofing" (BUR) substrate, installed on a roof surface. In this embodiment, the nonwoven web is fused to one surface of the polymer film to form an intermediate laminate. After the ultimate coating of asphalt is applied during the BUR process, the intermediate laminate is brought into contact with the asphalt coating such that the asphalt penetrates into the nonwoven web, thus adhering the intermediate laminate to the roof surface.

In yet another presently preferred embodiment, the present invention provides a polymer film to which a nonwoven web is fused on either side to form an intermediate laminate. The intermediate laminate is applied to a roofing membrane precursor to provide a multilayer roofing sheet. The nonwoven web on the upper or exterior surface of the multilayer roofing sheet provides predefined surface friction, such as, for example, a non-slip surface. Alternatively, the intermediate laminate can be adhered to a roof surface using an adhesive asphalt coating.

A rough or "fuzzy" surface can also be imparted to the lower surface of an upper layer by a variety of techniques. For example, a rough surface can be imparted by fiber deposition, such as by blowing, dropping or sprinkling fibers, onto the back of a suitable polymer film such that they adhere to the surface and create a "fuzzy" surfaced upper layer. The fibers can be adhered to the film, or, alternatively, can be partially embedded in and partially protrude from the surface of the film. The fibers employed can be organic fibers or inorganic polymer fibers, including glass fibers. The fibers can be applied by blowing, as is common in melt blowing of nonwoven fiber mats, for example, with the fibers collected directly on the surface of the film. The fiber density on the lower surface of the film does not need to be sufficiently great that a mat as dense as a fabric is created, but only dense enough so as to provide a structured surface capable of enhancing adhesion when assembled with other parts of the multilayer roofing sheet by mechanically interlocking means.

In addition to the deposition fibers, other methods can be employed to provide structured surfaces to enhance the bond between layers by mechanical interlock. For example, a polymer film can be provided with a surface texture by fine embossing, molding or microreplication. For example, the film can be made porous for enabling a mechanical interlock between layers. The porosity can be provided using a variety of techniques such as, for example, needle punching, perforation, generation of an open cell foam structure, or simply by using a microporous polymer film.

In some instances, it is preferable to have the top surface layer of a roofing sheet of the invention closed by a surface skin. Such a surface skin can serve to minimize bleed through in the case of an asphaltic or other lower viscosity under layer in the finished multilayer roofing sheet. In other cases, a more open porosity and/or permeability through the multilayer roofing sheet can be provided to enhance permeability, and increased water or other vapor transport and breathability.

Polymer film materials that can be employed in producing the multilayer roofing sheets of the present invention include polyvinyl chloride ("PVC"), polyolefins, acid containing olefin polymers, thermoplastic polyolefin ("TPO"), acrylics, acrylonitrile-styrene-acrylate ("ASA"), and acrylonitrile-ethylene-styrene ("AES"). Thermoplastic polymers are particularly desirable, but thermoset polymers can also be used when provided with a structured surface.

Materials which can be employed for imparting a "fuzzy" or rough surface include fabrics, scrims and nonwoven webs, formed from fibers. Such material can be formed from materials including but not limited to polyolefins, polyesters, glasses, nylons and mixtures thereof. Polypropylene nonwoven webs are particularly preferred. Nonwoven materials can include two or more layers having different physical characteristics. For example, the nonwoven material can include a porous low density body formed from fibers of a polymeric material overlaid with a non-porous, high density "skin" of the same polymeric material.

Films employed in the multilayer roofing products of the present invention can be pigmented with colorant systems to provide desirable aesthetics of the product and protection to underlying portions of the multilayer roofing products. Titanium dioxide is one preferred pigment. Other pigments can be used, particularly solar reflective pigments. Films employed in the multilayer roofing products of the present invention can have a plurality of layers. For example, such films can include an upper or top layer having predetermined color properties and infrared transmissivity, and an infrared reflecting layer, pigmented, for example with titanium dioxide infrared transparent layer, to provide a colored solar reflecting roofing layer.

Referring now to the drawings, in which like reference numerals refer to like elements in each of the several views, there are shown schematically in FIGS. 1, 2, 3 and 4 examples of multilayer roofing sheets according to the present invention.

FIG. 1 is a schematic cross-sectional representation of a first embodiment of multi-layer roofing sheet 10 according to the present invention, shown prior to assembly. The multilayer roofing sheet 10 includes an upper sheet 12 having a textured lower surface 18 and a lower sheet 22 having a fusible upper surface 28. The upper sheet 12 includes an upper layer 14 bonded to a lower layer 16. The upper layer 14 of the upper sheet 12 is formed from a polymer film such as a acrylonitrile-styrene-acrylate terpolymer bonded to a lower layer 16 formed from a nonwoven web of glass fibers. The lower sheet 22 includes a lower layer or substrate 24 to which is bonded an upper layer 26 formed from a fusible material, such as a bituminous coating composition. The lower sheet 22 can be, for example, a bituminous roofing sheet precursor.

The multilayer roofing sheet 10 is assembly by heating the fusible material forming the upper layer 26 of the lower sheet 22 until it melts sufficiently so that the fusible material can flow and penetrate into the nonwoven web of glass fibers forming the lower layer 16 of the upper sheet 12. Heat can be applied by conventional means, such as by a torch such as conventionally employed in the construction of built up roofing and the like. The upper sheet 12 is then applied over the lower sheet 22, and the fusible material of the upper layer 26 of the lower sheet then flow and interpenetrates with the nonwoven glass fiber of the lower layer 16 of the upper sheet 12, to form a bonding layer 30, such as depicted schematically in FIG. 2, which provides a mechanical interlock between the upper sheet 12 and the lower sheet 22.

Figure 3:
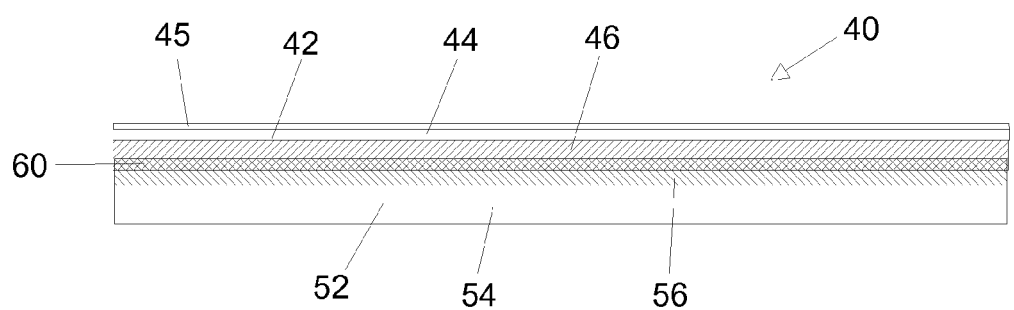
FIG. 3 is a schematic sectional elevation view of a multilayer roofing sheet according to a second embodiment of the present invention.

FIG. 3 is a schematic cross-sectional representation of a second embodiment of multi-layer roofing sheet 40 according to the present invention, shown after assembly. The multilayer roofing sheet 40 includes an upper sheet 42 having a textured lower surface and a lower sheet 52 having a fusible upper surface. The upper sheet 42 includes an upper layer 44 bonded to a lower layer 46, as well as a protective top covering layer 45. The upper layer 44 of the upper sheet 42 is formed from a polymer film such as a thermoplastic olefin bonded to a lower layer 46 formed from a nonwoven scrim of polypropylene fibers. The protective top covering layer 45 is formed from an acrylic coating composition in which is dispersed titanium dioxide pigment. The lower sheet 52 includes a lower layer or substrate 54 to which is bonded an upper layer 56 formed from a fusible material, such as a bituminous coating composition. The upper layer 56 of the lower sheet 54 interpenetrates with the lower layer 46 of the upper sheet 42 to form a bonding layer 60.

Figure 4:
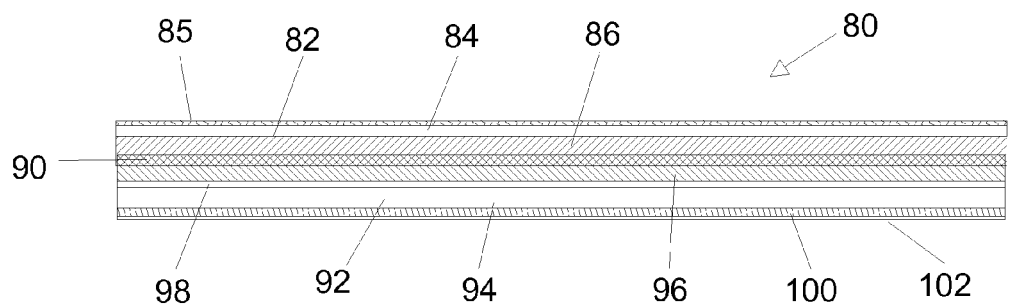
FIG. 4 is a schematic sectional elevation view of a multilayer roofing sheet according to a third embodiment of the present invention.

FIG. 4 is a schematic cross-sectional representation of a third embodiment of multi-layer roofing sheet 80 according to the present invention, shown after assembly. The multi-layer roofing sheet 80 includes an upper sheet 82 having a textured lower surface and a lower sheet 92 having a fusible upper surface. The upper sheet 82 includes an upper layer 84 integrally formed with the lower layer 86, as well as a protective top covering layer 85. The upper layer 84 of the upper sheet 82 is formed from a void-free polymer film such as a thermoplastic olefin integrally formed with the lower layer 86 formed from the same material, but including numerous open-cell pores (not shown). The protective top covering layer 85 is formed from a polypropylene film in which have been embedded fine mineral particles to provide a non-slip surface. The lower sheet 92 comprises an asphalt roofing membrane precursor and includes a lower layer 94 to which is bonded an upper layer 96 formed from a fusible material, such as a bituminous coating composition. The upper layer 96 of the lower sheet 94 interpenetrates into the pores of the lower layer 86 of the upper sheet 82 to form a mechanical interlock 90. The lower layer 94 of the lower sheet 92 includes a scrim of glass fiber reinforcement 98 as well as a layer of adhesive 100 covered with release paper 102. In an alternative embodiment (not shown), the lower layer 86 of the upper sheet 82 comprises a plurality of polymer or glass fibers embedded in the lower surface of the upper layer 84, the upper sheet 82 being prepared by depositing the fibers melt blowing, dropping or sprinkling the fibers onto the surface of the upper layer 84 to provide a "fuzzy" surface.

Conventional roofing production processes can be employed in the manufacture of multilayer roofing sheets of the present invention. Typically, bituminous roofing products are sheet goods that include a non-woven base or scrim formed of a fibrous material, such as a glass fiber mat. The base is coated with one or more layers of a bituminous material such as asphalt to provide water and weather resistance to the roofing product. Depending on the application, one side of the roofing product may be coated with mineral granules to provide durability, reflect heat and solar radiation, and to protect the bituminous binder from environmental degradation. Roofing granules can be embedded in the surface of such bituminous roofing products using conventional methods.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Such processes can be employed to form the lower sheet of the multilayer roofing products of the present invention. Modifications of such processes can be employed to form the upper sheet, with the proviso that a textured surface should be formed on the lower surface of the upper sheet.

The bituminous material used in manufacturing roofing products according to the present invention is derived from a petroleum processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, oils, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following example is provided to better disclose and teach processes and compositions of the present invention. It is for illustrative purposes only, and it must be acknowledged that minor variations and changes can be made without materially affecting the spirit and scope of the invention as recited in the claims that follow.

Example

A laminate of polyester fiber and a polymeric film (White Floor Runner, Filmtech, LLC. Parsippany, N.J.) was applied to the upper surface of an asphalt roofing membrane precursor material including a glass-fiber reinforced bituminous layer and lower surface covered with a bituminous adhesive layer covered with release paper. The upper surface of a web of the precursor material was heated using a laboratory heat gun to soften the bituminous material and a web of the laminate was applied, fiber side down, to the bituminous material to form a web of multilayer roofing material. The web of multilayer roofing material was passed through a compression roll while the bituminous material was still soft to press the bituminous material into the polyester fiber to form a mechanical interlock.

Various modifications can be made in the details of the various embodiments of the processes, compositions and articles of the present invention, all within the scope and spirit of the invention and defined by the appended claims.

The invention claimed is:

1. Roll roofing consisting of a multilayer roofing sheet comprising:
   a laminate formed from
   a) an upper sheet having a textured lower surface and comprising an upper layer and a lower layer, the lower layer of the upper sheet being selected from the group consisting of non-woven webs, microporous films, and sheets having microstructured surfaces; and
   b) a lower sheet having a fusible upper surface, the lower sheet comprising a lower layer and an upper layer, the upper layer having the fusible upper surface, the lower layer including a reinforcing scrim and an adhesive layer.

2. Roll roofing according to claim 1 wherein the upper layer of the multilayer roofing sheet comprises at least one polymer film formed from a polymer composition.

3. Roll roofing according to claim 2 wherein the polymer film is selected from the group consisting of polyvinyl chloride, polyethylene, polypropylene, acid-containing olefin polymers, fluoropolymers, thermoplastic olefin, thermoset polymers, acrylics, acrylonitrile-styrene-acrylate terpolymer, and acrylonitrile-ethylene-styrene terpolymer.

4. Roll roofing according to claim 2 wherein the polymer composition comprises a colorant system.

5. Roll roofing according to claim 4 wherein the colorant system comprises titanium dioxide.

6. Roll roofing according to claim 1 wherein the lower layer comprises fibers formed of a material selected from the group consisting of polyolefins, polyesters, glasses, inorganic polymers, and nylons.

7. Roll roofing consisting of a multilayer roofing sheet comprising a laminate formed from
   a) an upper sheet having at least two layers and a textured lower surface, wherein the texture of the lower surface of the upper sheet is provided by a plurality of pores; and
   b) a lower sheet having a fusible upper surface, the lower sheet comprising a lower layer and an upper layer, the upper layer having the fusible upper surface, the lower layer including a reinforcing scrim and an adhesive layer.

8. Roll roofing consisting of a multilayer roofing sheet comprising a laminate formed from
   a) an upper sheet having a textured lower surface, wherein the texture of the lower surface of the upper sheet is provided by a process selected from the group consisting of embossing, molding, and microreplication; and
   b) a lower sheet having a fusible upper surface, the lower sheet comprising a lower layer and an upper layer, the upper layer having the fusible upper surface, the lower layer including a reinforcing scrim and an adhesive layer.

9. Roll roofing according to claim 7 wherein the upper layer comprises at least one polymer film formed from a polymer composition.

10. Roll roofing according to claim 9 wherein the polymer film is selected from the group consisting of polyvinyl chloride, polyethylene, polypropylene, acid-containing olefin polymers, fluoropolymers, thermoplastic olefin, thermoset polymers, acrylics, acrylonitrile-styrene-acrylate terpolymer, and acrylonitrile-ethylene-styrene terpolymer.

11. Roll roofing according to claim 9 wherein the polymer composition comprises a colorant system.

12. Roll roofing according to claim 11 wherein the colorant system comprises titanium dioxide.

13. Roll roofing according to claim 7 wherein the lower layer comprises fibers formed of a material selected from the group consisting of polyolefins, polyesters, glasses, inorganic polymers, and nylons.

14. Roll roofing according to claim 8 wherein the upper layer comprises at least one polymer film formed from a polymer composition.

15. Roll roofing according to claim 14 wherein the polymer film is selected from the group consisting of polyvinyl chloride, polyethylene, polypropylene, acid-containing olefin polymers, fluoropolymers, thermoplastic olefin, thermoset polymers, acrylics, acrylonitrile-styrene-acrylate terpolymer, and acrylonitrile-ethylene-styrene terpolymer.

16. Roll roofing according to claim 14 wherein the polymer composition comprises a colorant system.

17. Roll roofing according to claim 16 wherein the colorant system comprises titanium dioxide.

18. Roll roofing according to claim 8 wherein the lower layer comprises fibers formed of a material selected from the group consisting of polyolefins, polyesters, glasses, inorganic polymers, and nylons.

* * * * *